(12) United States Patent
Sato et al.

(10) Patent No.: US 7,738,216 B2
(45) Date of Patent: Jun. 15, 2010

(54) THIN FILM MAGNETIC HEAD HAVING A THERMAL PLASTIC DEFORMATION PORTION AND MANUFACTURING THE SAME

(75) Inventors: Masanobu Sato, Niigata-ken (JP); Akihiro Sato, Niigata-ken (JP); Hiroyuki Kobayashi, Niigata-ken (JP)

(73) Assignee: TDK Corporation, Tokyo (JP)

( * ) Notice: Subject to any disclaimer, the term of this patent is extended or adjusted under 35 U.S.C. 154(b) by 832 days.

(21) Appl. No.: 11/486,779

(22) Filed: Jul. 14, 2006

(65) Prior Publication Data

US 2007/0025021 A1    Feb. 1, 2007

(30) Foreign Application Priority Data

Jul. 26, 2005    (JP)    ............................. 2005-215863

(51) Int. Cl.
*G11B 5/60* (2006.01)
(52) U.S. Cl. ................ 360/294.7; 360/236.5; 360/234.3
(58) Field of Classification Search ............. 360/234.3, 360/236.5, 294.7
See application file for complete search history.

(56) References Cited

U.S. PATENT DOCUMENTS

| | | | | |
|---|---|---|---|---|
| 5,991,113 | A * | 11/1999 | Meyer et al. ................... | 360/75 |
| 7,283,328 | B2 * | 10/2007 | Ota et al. ..................... | 360/128 |
| 7,502,205 | B1 * | 3/2009 | Hurtado et al. ........... | 360/294.7 |
| 7,549,212 | B2 * | 6/2009 | Mei et al. ................. | 29/603.07 |
| 7,558,022 | B2 * | 7/2009 | Kurita et al. ............. | 360/234.4 |
| 2003/0174430 | A1 * | 9/2003 | Takahashi et al. ............. | 360/75 |
| 2004/0257707 | A1 * | 12/2004 | Thurn et al. ............. | 360/234.7 |
| 2005/0013057 | A1 * | 1/2005 | Kurita et al. ............. | 360/294.7 |
| 2007/0159729 | A1 * | 7/2007 | Yoo et al. ................ | 360/294.7 |

FOREIGN PATENT DOCUMENTS

| | | |
|---|---|---|
| JP | 04-134770 | 5/1992 |
| JP | 5-62140 | 3/1993 |
| JP | 10-049822 | 2/1998 |
| JP | 11-328643 | 11/1999 |
| JP | 2001-351347 | 12/2001 |
| JP | 2002-100015 | 4/2002 |
| JP | 2004-110916 | 4/2004 |
| WO | WO 02/37480 | 5/2002 |
| WO | WO 2004/050292 | 6/2004 |

OTHER PUBLICATIONS

Notice of Preliminary Rejection for corresponding Japanese Patent Application Serial No. 2005-215863, dated Jul. 17, 2007.
Decision of Refusal for corresponidng Japanese Patent Application Serial No. 2005-215863, dated Nov. 6, 2007.
Notice of Allowance issued in corresponding Japanese Patent Application No. 2005-215863; issued May 7, 2008.

* cited by examiner

*Primary Examiner*—Jefferson Evans
(74) *Attorney, Agent, or Firm*—Brinks Hofer Gilson & Lione

(57) ABSTRACT

A thin film magnetic head includes a slider that floats from a surface of a recording medium by an airflow generated on the surface of the recording medium to be rotated, and a thin film magnetic head element structure that is formed on an air discharging end face of the slider. A thermal plastic deformation portion is provided in the vicinity of the air discharging end face on a back surface of a recording medium facing surface of a slider so that a part of the thin film magnetic head element structure is further spaced from the surface of the recording medium than the recording medium facing surface of the slider.

4 Claims, 5 Drawing Sheets

THIN FILM MAGNETIC HEAD HAVING A THERMAL PLASTIC DEFORMATION PORTION AND MANUFACTURING THE SAME

This application claims the benefit of the Japanese Patent Application No. P2005-215863 filed on Jul. 26, 2005, which is hereby incorporated by reference.

BACKGROUND

1. Field a floating thin film magnetic head and a method of manufacturing the same is provided.

2. Related Art

A floating thin film magnetic head includes a slider in which a magnetoresistance effect element or an inductive element and is incorporated. A flexure is made of a flexible metal sheet adhesively fixing the slider to a free end thereof. A load beam fixes the flexure. In the floating thin film magnetic head, when a recording medium stops, a lower surface of the slider contacts with a surface of the recording medium by an elastic force of the load beam, and when the recording medium begins to move, the slider floats from the surface of the recording medium by a floating force, which is produced by an airflow led between the slider and the surface of the recording medium along a moving direction of the recording medium. By maintaining such floated state, the thin film magnetic head performs a recording operation and a reproducing operation.

A reproducing element and a recording element are laminated on an air discharging end face of the slider. The reproducing element includes the magnetoresistance effect element in which a resistance according to an intensity of an external magnetic field changes and an electrode layer electrically connecting with the magnetoresistance effect element.

The recording element includes a lower core layer that is laminated by inserting a magnetic gap layer magnetically connected at a position that is retreated from a surface opposite to the recording medium (hereinafter, refer to "a medium facing surface"), an upper core layer, and a coil layer of which a recording magnetic field is applied to the upper core layer and the lower core layer. Such reproducing element and recording element are covered with a protective layer, which is made of an insulating material such as $Al_2O_3$ or the like.

The thin film magnetic head performs a reproducing operation by detecting a resistance change of the electrically connected magnetoresistance effect element, and performs a recording operation by producing a dielectric magnetic field in the lower core layer and the upper core layer by means of a power feeding toward the coil layer and applying a leakage magnetic field as the recording magnetic field from the magnetic gap layer to the recording medium.

During the recording and the reproducing operations of the thin film magnetic head, the temperature of the reproducing element rises by a current that flows into the magnetoresistance effect element, and the temperature of the recording element rises by an exothermic heat of the coil layer due to the current flowing into the coil layer.

As above-mentioned, since the reproducing element and the recording element are covered with the protective layer made of the insulating material, the heat of the reproducing element and the recording element are not emitted outward. The temperature of the reproducing element and the recording element is high. Due to the temperature rise of the reproducing element and the recording element, an overall structure of the thin film magnetic head that includes the reproducing element, the recording element, and the protective layer is thermally expanded to protrude from the medium facing surface. In the related art, in order to avoid of the contact the thin film magnetic head with the recording medium, various measures, of which the thin film magnetic head element structure is ground obliquely, or a tip of the thin film magnetic head element structure is provided with a notch, are employed.

The related art is disclosed in JP-A-10-49822 and JP-A-11-328643.

Recently, in order to cope with the high recording density of the recording medium, it is required that a floating distance (a distance between the surface of the recording medium and the reproducing element and the recording element) of the thin film magnetic head is set to less than 1.5 nm. As mentioned above, in a case where the floating distance becomes significantly smaller, it is very difficult to prevent the element structure protruding from the medium facing surface by the thermal expansion from contacting with the recording medium. The risks such as the damage of the recording medium and the magnetic information recorded on the recording medium and the damage of the element structure in itself further increase. In order to achieve the high recording density, a frequency of the current applied to the magnetoresistance effect element and the coil layer should be high. For example, the temperature of the recording element is mainly above 100° C., thus the protruding amount of the overall element structure is large.

Conventionally, the thin film magnetic head element structure is ground and the element structure is provided with a notch. Since a target floating distance of the thin film magnetic head is very small, a grinding error and a forming error of the notch have a large effect on the floating distance, and a variation between individuals increases.

SUMMARY

The invention has been made on the basis of the view points of which the floating distance is suppressed less than 15 nm to prevent the thin film magnetic head from being contacted with the recording medium, if a part of the only thin film magnetic head element structure is significantly spaced from the surface of the recording medium, and the thermal plastic deformation is utilizes to allow the thin film magnetic head element structure to be spaced from the recording medium and the position applying the heat energy to the slider is adjacent to the air discharging end face without changing the slider shape as much as possible.

A thin film magnetic head includes a slider that floats from a surface of a recording medium by an airflow generated on the surface of the recording medium to be rotated. A thin film magnetic head element structure is formed on an air discharging end face of the slider. A thermal plastic deformation portion is provided in the vicinity of the air discharging end face on a back surface of a recording medium facing surface of a slider so that a part of the thin film magnetic head element structure is further spaced from the surface of the recording medium than the recording medium facing surface of the slider.

A method of manufacturing a thin film magnetic head according to another aspect of the invention includes: forming a thin film magnetic head element structure on an air discharging end face of a slider, which floats from a surface of a recording medium by an airflow generated on the surface of the recording medium to be rotated; and forming a thermal plastic deformation portion in the vicinity of the air discharging end face on a back surface of a recording medium facing surface of the slider by applying heat energy from a heat source so that a part of the thin film magnetic head element structure is further spaced from the surface of the recording medium than the recording medium facing surface of the slider.

In another embodiment, the method of manufacturing the thin film magnetic head further includes adjusting a distance, in which the thin film magnetic head element structure is further spaced from the surface of the recording medium than the recording medium that faces the surface of the slider, by an amount of heat energy applied to the vicinity of the air discharging end face of the slider. It is preferable that the distance is set to obtain a targeted floating distance (a distance from the surface of the recording medium to the thin film magnetic head element) when the thin film magnetic head element structure is thermally expanded by an electric connection.

In the method of manufacturing the thin film magnetic head, for example, a solid laser, a $CO_2$ laser, an excimer laser, or a fiber laser may be used as the heat source. When the laser is used as the heat source, it is preferable that the amount of heat energy that is applied to the vicinity of the air discharging end face of the slider is controlled by any one of a laser irradiated position, a laser power, a laser irradiating time, and the number of laser irradiation, or by a combination thereof. By the laser irradiating conditions that includes the laser irradiated position, the laser power, the laser irradiating time, and the number of laser irradiation, it is capable of forming easily the uniform thermal plastic deformation portions and capable of suppressing a variation between individuals thereof.

The thermal plastic deformation portion is one or more striated portions formed parallel to the air discharging end face of the slider.

DRAWINGS

Figure 5:
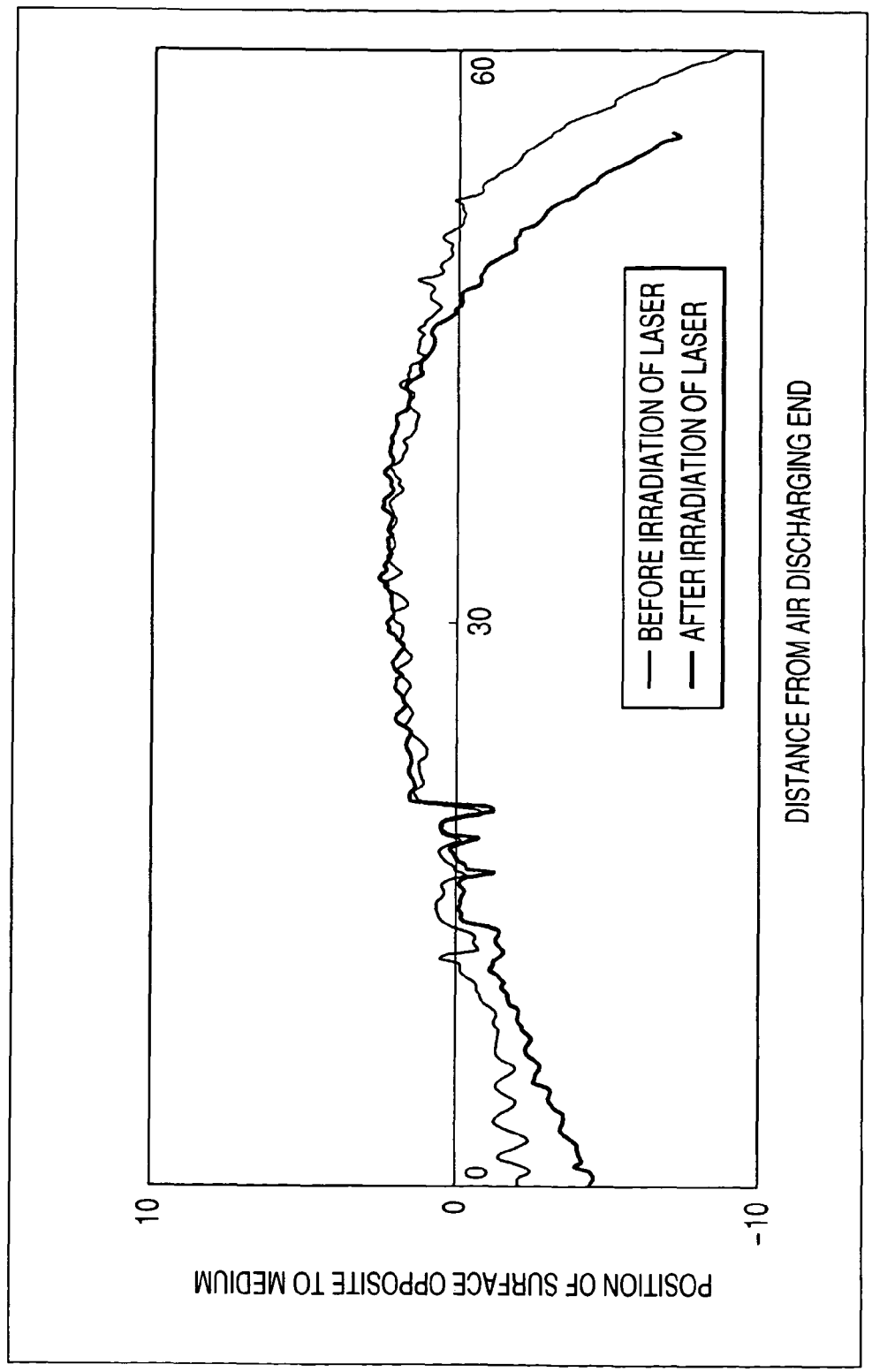
Figure 6:
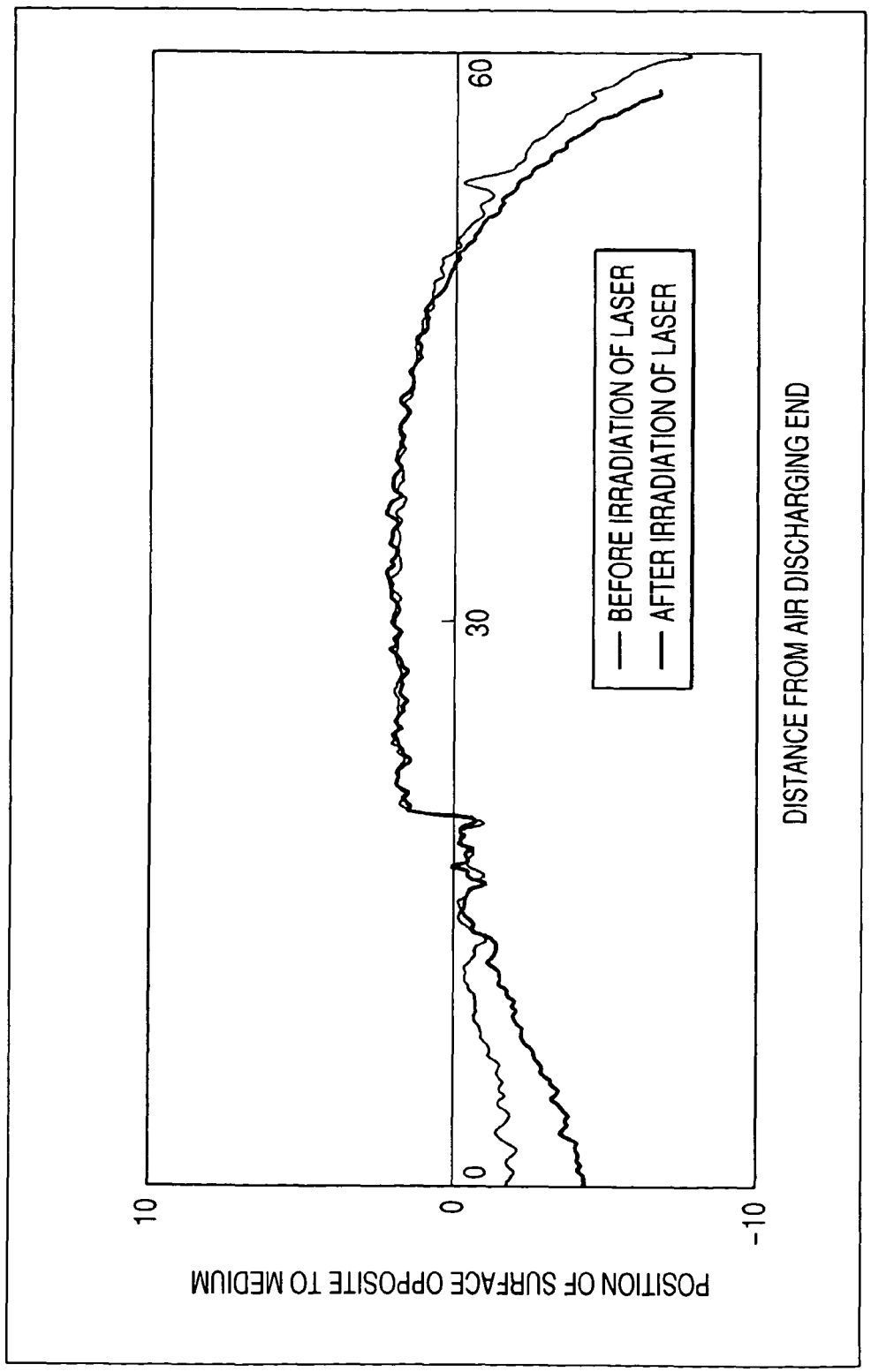

FIG. 5 is a shape profile showing by comparing shape changes of the medium facing surface of the slider in relation to before and after forming of a thermal plastic deformation portion according to the first embodiment; and FIG. 6 is a shape profile showing by comparing shape changes of the medium facing surface of the slider in relation to before and after forming of a thermal plastic deformation portion according to a second embodiment.

DESCRIPTION

Figure 1:
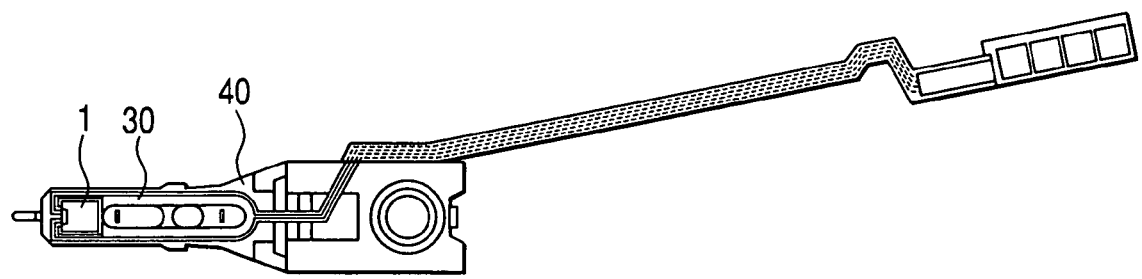
FIG. 1 is an overall plan view of a thin film magnetic head.

FIG. 1 is an overall plan view of a thin film magnetic head. The thin film magnetic head includes a substantially rectangular solid floating slider 1 made of $Al_2O_3$—TiC. A flexure 30 is made of a flexible metal sheet adhesively fixing the slider 1 to a free end thereof. A load beam 40 has the flexure 30 fixed thereto. In the thin film magnetic head, when a recording medium stops, a lower surface (medium facing surface) of the slider 1 is in contact with a surface of the recording medium by an elastic force of the load beam. When the recording medium begins to move, the slider 1 floats from the surface of the recording medium by a floating force, which is generated by an airflow led between the slider 1 and the surface of the recording medium along a moving direction of the recording medium. With maintaining such floated state, the thin film magnetic head performs a recording operation and a reproducing operation. The medium facing surface of the slider 1 has a curved shape (crown and cross crown).

Figure 2:
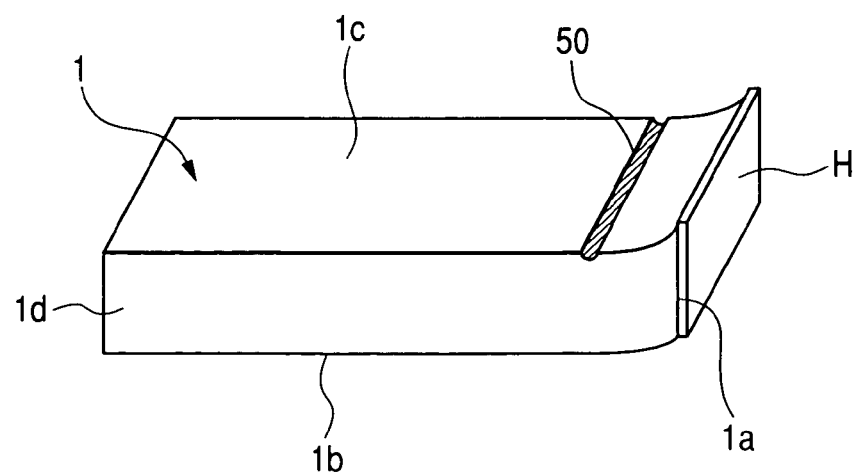
FIG. 2 is an enlarged perspective view of a floating slider and a thin film magnetic head element structure shown in FIG. 1.
Figure 3:
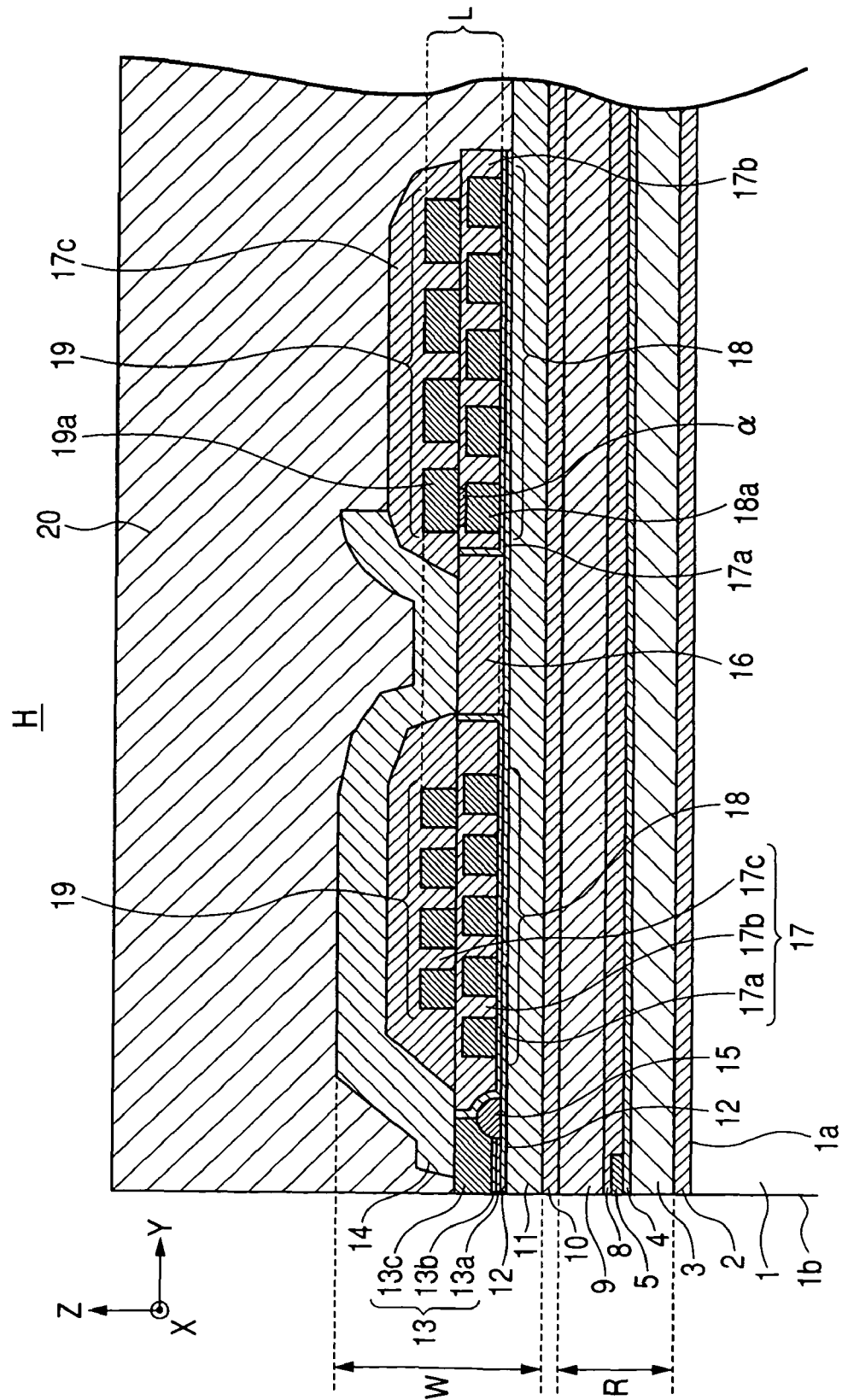
FIG. 3 is a cross-sectional view taken along a centerline of the element structure, which illustrates a laminated structure of the thin film magnetic head element structure.

As shown in FIG. 2, the thin film magnetic head includes a thin film magnetic head element structure H that includes a reproducing element R, a recording element W, and an insulating protective layer 20, which is formed in an air discharging end face 1a of the floating slider 1, and has the purpose of a recording and a reproduction. FIG. 3 is a cross-sectional view, which illustrates a laminated structure of the thin film magnetic head element structure H, taken along the centerline of the element structure. In FIG. 3, an X-direction, a Y-direction, and a Z-direction are defined as a track width direction, a depth direction (a height direction), and a laminating direction of respective layers configuring the thin film magnetic head element structure, respectively.

The reproducing element R includes a lower shield layer 3, a lower gap layer 4, a magnetoresistance effect element 5, an upper gap layer 8, and an upper shield layer 9, which are laminated on an undercoat 2 in this order. The lower shield layer 3 and the upper shield layer 9 are formed of a soft magnetic material such as NiFe, and the lower gap layer 4 and the upper gap layer 8 are formed of a non-magnetic material such as $Al_2O_3$. The magnetoresistance effect element 5 is a GMR element exerting a large magnetoresistance effect that is represented by a spin valve film, a TMR element that exerts a tunnel magnetoresistance effect, and an AMR element exerting an anisotropic magnetoresistance effect.

A bias layer 6 made of a high magnetism material such as a CoPt alloy, and a pair of electrode layers 7, which is made of a good conductive material such as Au and connected to the magnetoresistance effect element 5, are formed on the lower gap layer 4, on both sides of the magnetoresistance effect element 5 in the X-direction. A distance between the pair of electrode layers 7 is equal to a width of the reproducing track. The upper gap layer 8 and the upper shield layer 9 are located on the pair of the electrode layers 7. Even though not shown in the drawings, a bias foundation layer made of a metal film such as Cr or Ta is formed between the lower gap layer 4 and the bias layer 6.

As shown in FIG. 3, the tips of the respective layers (the lower shield layer 3, the lower gap layer, the magnetoresistance effect element 5, the upper gap layer 8, and the upper shield layer 9) configuring the reproducing element R are exposed to the medium facing surface 1b of the slider 1. The reproducing element R performs the reproducing operation by applying a constant current to the magnetoresistance effect element 5 and by reading the resistance changes of the magnetoresistance effect element 5 to an external magnetic field as the voltage changes. The reproducing element R according to the embodiment has a CIP (Current In Plane) structure in which the constant current flows in an in-plane direction of the film, but may have a CPP (Current Perpendicular to Plane) structure in which the constant current flows in a direction perpendicular to plane of the film.

A separating insulating layer 10 made of an insulating material such as $Al_2O_3$ is formed on the upper shield layer 9, which is the uppermost layer of the reproducing element R.

The recording element W is laminated on the reproducing element R with the separating insulating layer 10 interposed therebetween.

The recording element W includes a lower core layer 11, a plating foundation layer 12, a recording core portion 13, an upper core layer 14, a Gd determining insulating layer 15, a magnetic connection portion 16, and a coil layer L, which are laminated on the separating insulating layer 10 facing the medium facing surface 1b in this order. For example, the upper core layer 14 is laminated on the recording core portion 13 so as not to be exposed to the medium facing surface, and the Gd determining insulating layer 15 is made of an organic insulating material such as a resist.

The magnetic connection portion 16 connects the lower core layer 11 with the upper core layer 14 by inserting the plating foundation layer 12 therebetween. The coil layer L is embedded in the insulating layer 17. The lower core layer 11 and the upper core layer 14 are formed of a magnetic material, for example, a permalloy, a Co alloy, or a Fe alloy, and the plating foundation layer 12 is formed of a conductive material.

The recording core portion 13 has a three-layer structure having a lower magnetic pole layer 13a magnetically connected with the lower core layer 11 through the plating foundation layer 12, a gap layer 13b made of a non-magnetic metal material, and an upper magnetic pole layer 13c magnetically connected with the upper core layer 14. The lower magnetic pole layer 13a and the upper magnetic pole layer 13c may be formed of the magnetic material, for example, the permalloy, the Co alloy or the Fe alloy. Preferably, the lower magnetic pole layer 13a and the upper magnetic pole layer 13c are formed of a magnetic material having a saturation magnetic flux density lager than the lower core layer 11. An insulating foundation layer 17a and a first coil insulating layer 17b, which are a part of the insulating layer 17, are formed on both sides of the recording core portion 13 in the track width direction.

A writing track width W-Tw of the recording element W is defined by the size of the recording core portion 13 which is exposed to the medium facing surface in the track width direction. The size of the recording core portion 13, which is exposed to the medium facing surface in the track width direction, is preferably set less than about 0.5 μm so as to cope with the high recording density, and more preferably, the size of the recording core portion 13, which is exposed to the medium facing surface in the track width direction, is set less than about 0.2 μm. The thickness of the lower magnetic pole layer 13 is, for example, about 0.3 μm, the thickness of the gap layer 13b is, for example, about 0.1 μm, and the thickness of the upper magnetic pole layer 13c is, for example, is about 2.4 to 2.7 μm.

The Gd determining insulating layer 15 is formed at a position retreated by a predetermined length in a depth direction from the medium facing surface, and defines the size of the gap layer 13b of the recording core portion 13 in the depth direction. For example, the gap depth (Gd) of the recording element W is regulated by the distance from the medium facing surface to the tip of the Gd determining insulating layer 15. The magnetic connection portion 16 is formed of the magnetic material such as the permalloy, the Co alloy, or the Fe alloy.

The insulating layer 17 includes an insulating foundation layer 17a, a first coil insulating layer 17b, and a second coil insulating layer 17c. The insulating foundation layer 17a covers exposed surfaces of the upper magnetic pole layer 13c, the Gd determining insulating layer 15, the plating foundation layer 12, and the magnetic connection portion 16. The first coil insulating layer 17b is formed on the insulating foundation layer 17a to cover a first coil layer 18 and a space between pitches of the first coil layer 18, and the second coil insulating layer 17c is formed on the first coil insulating layer 17b to cover a second coil layer 19 and a space between pitches of the second coil layer 19. The above-mentioned upper core layer 14 is formed on the second coil insulating layer 17c. As shown in FIG. 3, the insulating foundation layer 17a and the first coil insulating layer 17b are exposed to the medium facing surface. This insulating layer 17 is formed of an inorganic insulating material such as $Al_2O_3$ or $SiO_2$, or the organic insulating material such as a resist.

The coil layer L is formed of a conductive material having a low electric resistance, for example, Cu, and has a two-layer structure including the first coil layer 18 that is wound in a spiral around a winding center portion 18a and a spiral second coil layer 19 that is wound in a reverse direction with respect to the direction of the first coil layer 18. The first coil layer 18 and the second coil layer 19 are connected with each other at the winding center portions 18a and 19a through a contact conductor α.

Even though not shown in the drawings, a first coil lead layer connected with the first coil layer 18 is formed at a winding end portion of the first coil layer 18. The coil layer L may be not only a single-layer structure, but also a multi-layer structure having three or more layers. The recording element W performs the recording operation by generating a dielectric magnetic field in the lower core layer 11 and the upper core layer 14 by means of a recording current flowing in the coil layer L and by applying the leakage magnetic field leaking from the gap layer 13b of the recording core portion 13 to the recording medium. The recording element W according to the embodiment has a longitudinal magnetic recording medium structure, but may have a perpendicular magnetic recording medium structure.

The insulating protective layer 20, which is made of insulating material, for example, $Al_2O_3$, is formed so as to entirely cover both the recording element W and the reproducing element R.

Figure 4:
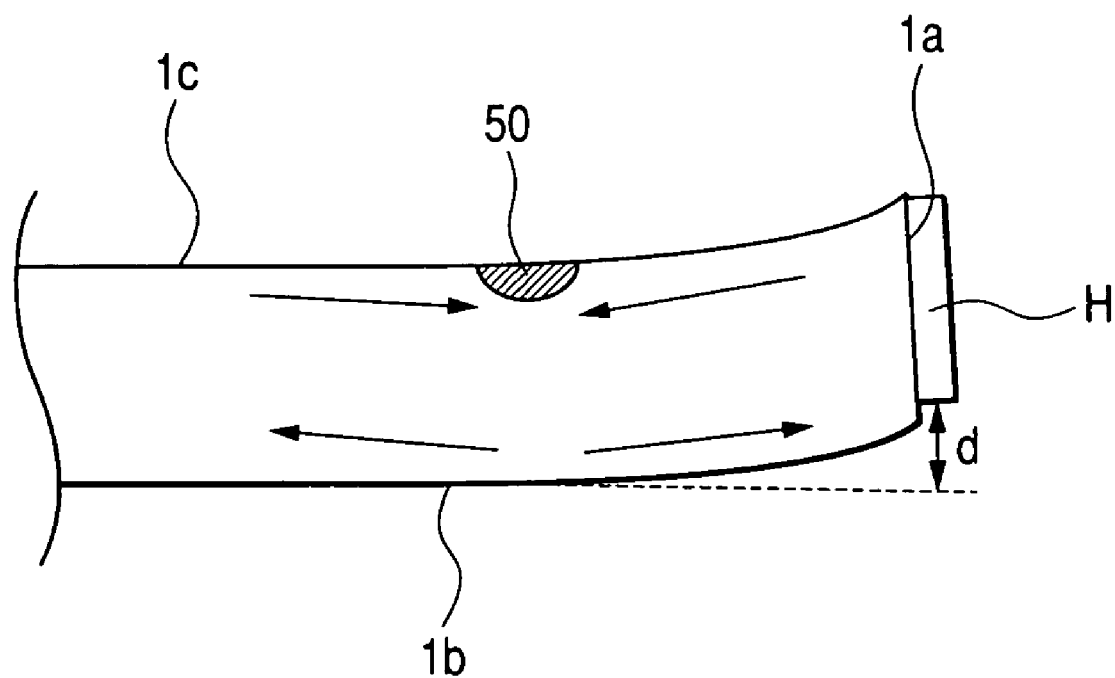
FIG. 4 is a pattern diagram that illustrates an appearance of which the slider warps by a shrinkage stress producing during re-solidification, after a laser irradiating region on a back surface of a medium facing surface of the slider is melted.

As shown in FIGS. 2 and 4, the thin film magnetic head having the above-mentioned overall structure has a thermal plastic deformation portion 50. The thermal plastic deformation portion 50 is provided in the vicinity of the air discharging end face on a back surface 1c of the recording medium facing surface 1b of the slider 1 so that a part of the thin film magnetic head element structure H is further spaced from the surface of the recording medium more than the recording medium facing surface 1b of the slider 1. Since the thin film magnetic head element structure H is locally bent by thermal plastic deformation portion 50, the thermal plastic deformation portion 50 has a small effect on the curved shape (crown and cross crown) of the slider 1.

The thermal plastic deformation portion 50 is formed by applying the heat energy to the back surface 1c of the slider 1, and is made of a one striated portion parallel to the air discharging end face 1a of the slider 1 in the embodiment of the invention. For example, a fiber laser, which performs a fine processing and is capable of obtaining a large work distance, is used as a heat source. If a laser beam is irradiated on the back surface 1c of the slider 1, the laser irradiated portion is instantly melted and then re-solidified, but by the shrinkage stress generated during the re-solidification, the medium facing surface 1b warps into a convex shape, and the back surface 1c warps into a convex shape.

If the laser irradiated position is set in the vicinity of the air discharging end face (the thin film magnetic head element structure H) of the slider 1, the distance form the laser irradiated position to the air discharging end face 1a is sufficiently shorter than the distance from the laser irradiated position to an air inflowing end side. For this reason, the effect of the laser beam on the air inflowing end side is smaller than that on the laser irradiated position. Accordingly, it is possible to warp only the air inflowing end side except the laser irradiated position.

For example, while maintaining the shape of the medium facing surface 1b and back surface 1c of the slider 1 except the vicinity of the air discharging end face, it is possible to bend the air discharging end and the thin film magnetic head element structure H in the direction spaced from the surface of the recording medium. Here, the vicinity of the air discharging end face (the thin film magnetic head element structure H) of the slider 1 means a position adjacent to the air discharging end face. For example, a position of which the distance from the air discharging end face is less than a few hundred μm. Arrow directions in FIG. 4 indicate the directions of the shrinkage stress generated during the re-solidification of the laser irradiated portion.

The warping shape of the air discharging end side of the slider 1 is changed depending on an amount of the heat energy, which is applied to the vicinity of the air discharging end face on the back surface 1c of the slider 1. For example, as the amount of the heat energy increases, the extent of the warping becomes larger. The amount of the heat energy applied to the vicinity of the air discharging end face can be controlled by laser irradiating conditions that includes the laser irradiated position (the distance from the air discharging end face thereto), a laser power, a laser irradiating time, and the number of laser irradiation. The distance d (see FIG. 4) of which the thin film magnetic head element structure H is spaced from the surface of the recording medium rather than the medium facing surface 1b of the slider 1 is set so as to obtain the target floating distance when the thin film magnetic head element structure H is thermally expanded by applying current into the elements.

The thermal plastic deformation portion 50 according to the embodiment of the invention is made of the striated portion having the width of about 20 to 30 μm. The striated portion is formed at the position, which is apart from the air discharging end face by about 200 μm, by irradiating the laser beam having a power of about 23 W at a scanning speed of about 1 m/sec parallel to the air discharging end face. The depth of the thermal plastic deformation portion 50 is about 3 to 5 μm, and this depth is about 1/10 of the thickness of the slider 1 having about 0.3 to 0.5 mm. By providing the thermal plastic deformation portion 50, it is possible to allow the thin film magnetic head element structure H to warp about 5 nm (=d) rather than the medium facing surface 1b of the slider 1 in the direction in which the thin film magnetic head element structure H is apart from the surface of the recording medium.

As described above, if the thermal plastic deformation portion 50 is provided in the vicinity of the air discharging end face on the back surface 1c of the slider 1, the shape of the slider 1 is changed as little as possible, and the thin film magnetic head element structure H is bent in the direction that the thin film magnetic head element structure H is apart from the surface of the recording medium rather than the medium facing surface 1b of the slider 1. Even when the floating distance of the thin film magnetic head is set less than about 15 nm, it is possible to prevent the thin film magnetic head element structure H from protruding due to the thermal expansion from coming in contact with the surface of the recording medium. Both the improved reliability of the head and the high recording density may be accomplished concurrently. Since the thermal plastic deformation portion 50 is formed by the laser irradiation, a uniform thermal plastic deformation portion may be formed easily by keeping the laser irradiating conditions (the laser irradiated position, the laser power, the laser irradiating time, and the number of laser irradiation) constant. Accordingly, it is possible to suppress the variation between individuals thereof.

In FIGS. 5 and 6, the profiles of the medium facing surface 1b of the slider 1 before and after forming of the thermal plastic deformation portion 50 are shown and compared with each other. The thermal plastic deformation portion 50 reaches the lateral face 1d of the slider 1 shown in FIG. 2, and is formed of the one striated portion parallel to the air discharging end face 1a.

FIG. 5 shows a first embodiment of which the thermal plastic deformation portion 50 is formed by the laser irradiating condition 1 (a scan position; a position that is apart from the air discharging end face by about 80 μm, the laser power of 23 W, the scanning speed of 2000 mm/sec, the work distance of 163 mm).

FIG. 6 shows a second embodiment of which the thermal plastic deformation portion 50 is formed by the laser irradiating condition 2 (a scan position; a position that is apart from the air discharging end face by about 60 μm, the laser power of 23 W, the scanning speed of 1000 mm/sec, the work distance of 163 mm). In FIGS. 5 and 6, a vertical axis represents the position of the medium facing surface of the slider 1, and a horizontal axis represents the position from the air discharging end face 1a.

Referring to FIGS. 5 and 6, when the thermal plastic deformation portion 50 is formed by the laser irradiation, it is apparent that only the air discharging end side of the slider 1 is bent in the direction away from the surface of the recording medium.

When measuring the crown change of the medium facing surface 1b of the slider 1 in the first embodiment and the second embodiment shown in FIGS. 5 and 6, the crowns before the laser irradiation and after the laser irradiation are constant at about 41.0 nm in the first embodiment, and the crowns before the laser irradiation and after the laser irradiation are about 40.5 nm and a 39.6 nm, respectively, in the second embodiment, that is, the crowns are slightly different places. For this reason, even though the thermal plastic deformation portion 50 is formed, the crown shape of the slider 1 is not significantly changed.

According to the embodiments of the invention, the thermal plastic deformation portion 50 is formed of the one striated portion, which reaches the lateral face 1d of the slider 1. However, the thermal plastic deformation portion 50 may be formed of a plurality of striated portions. The striated portions may not reach the lateral face 1d of the slider 1, and may be formed at the only center portion of the back surface 1c of the slider 1. A fiber laser is used as the heat source of forming the thermal plastic deformation portion 50, but the heat source is not limited thereto and a solid laser such as a YAG, a gas laser such as $CO_2$ or an excimer, or a heat source other than these may be used as the heat source.

The embodiments of the invention are applied to the sound recording-reproducing thin film magnetic head including the reproducing element R and the recording element W, but are applicable to a reproducing only thin film magnetic head including the only reproducing element R and a recording only thin film magnetic head including the only recording element W. In addition, the invention is also applicable to a thin film magnetic head including a FHA (Flying Height Adjust) mechanism.

The invention is applicable to any one of a contact start stop (CSS) type and a ramp load type thin film magnetic head.

The invention claimed is:

1. A thin film magnetic head comprising:
a slider that floats from a surface of a recording medium by an airflow generated on the surface of the recording medium to be rotated; and
a thin film magnetic head element structure that is formed on an air discharging end face of the slider,
wherein a thermal plastic deformation portion is provided in the vicinity of the air discharging end face on a back surface of a recording medium facing surface of a slider and the thermal plastic deformation portion is formed by melting a portion of the slider and re-solidfying the portion,
wherein a part of the thin film magnetic head element structure is further spaced from the surface of the recording medium than the recording medium facing surface of the slider, and
wherein the recording medium facing surface of the slider warps into a convex shape toward the recording medium.

2. The thin film magnetic head according to claim 1, wherein the thermal plastic deformation portion is at least one striated portion, which is formed parallel to the air discharging end face of the slider.

3. The thin film magnetic head according to claim 2, wherein the thermal plastic deformation portion is at the position which is apart from the air discharging end face by 60 µm to 200 µm.

4. The thin film magnetic head according to claim 1, wherein the distance from the thin film magnetic head element structure to the recording medium is greater than the distance from the recording medium facing surface to the recording medium.

* * * * *